United States Patent

Alofs et al.

[11] Patent Number: 5,916,285
[45] Date of Patent: Jun. 29, 1999

[54] METHOD AND APPARATUS FOR SENSING FORWARD, REVERSE AND LATERAL MOTION OF A DRIVERLESS VEHICLE

[75] Inventors: Cornell W. Alofs; Ronald R. Drenth, both of Petoskey, Mich.

[73] Assignee: Jervis B. Webb Company, Farmington Hills, Mich.

[21] Appl. No.: 08/713,539

[22] Filed: Sep. 13, 1996

Related U.S. Application Data

[XX.
[60] Provisional application No. 60/005,540, Oct. 18, 1995.
[51] Int. Cl.$^6$ .................................................. B60B 33/00
[52] U.S. Cl. ................................. 701/23; 701/26; 701/41
[58] Field of Search ................................. 701/23, 26, 41, 701/42, 1; 180/168, 415, 402, 446; 33/203.18

[56] References Cited

U.S. PATENT DOCUMENTS

| | | | |
|---|---|---|---|
| 4,347,573 | 8/1982 | Friedland | 701/220 |
| 4,667,365 | 5/1987 | Martinek | 303/176 |
| 4,679,645 | 7/1987 | Galloway et al. | 180/65.8 |
| 4,768,536 | 9/1988 | Hawkins | 180/907 |
| 4,816,998 | 3/1989 | Ahlbom | 701/23 |
| 4,847,769 | 7/1989 | Reeve | 701/23 |
| 5,058,023 | 10/1991 | Kozikaro | 701/217 |
| 5,175,415 | 12/1992 | Guest | 33/700 |
| 5,218,556 | 6/1993 | Dale, Jr. | 364/528 |
| 5,364,113 | 11/1994 | Goertzen | 280/81.6 |

FOREIGN PATENT DOCUMENTS

| | | |
|---|---|---|
| 0556689 | 8/1993 | European Pat. Off. . |
| 0576070 | 12/1993 | European Pat. Off. . |
| 2158965 | 5/1984 | United Kingdom . |
| 2158965 | 11/1985 | United Kingdom . |

*Primary Examiner*—Tan Q. Nguyen
*Attorney, Agent, or Firm*—Dickinson Wright PLLC

[57] ABSTRACT

This invention relates to a swivel caster fitted with rotational and swivel angle measurement sensors mounted to a driverless vehicle so that the lateral motion of the vehicle can be detected and accounted for by the vehicle's navigation and guidance system. A preferred embodiment of the present invention is a driverless vehicle comprising a navigation and guidance system having an angular motion sensor and a track wheel caster assembly equipped with a caster pivot sensor and a wheel rotation sensor to determine the relative position of the vehicle by taking into account substantially all movement of the vehicle along the surface upon which the vehicle is travelling. These sensors enable the navigation system to more accurately determine the vehicles current position and enable the guidance system to better guide the vehicle.

36 Claims, 4 Drawing Sheets

METHOD AND APPARATUS FOR SENSING FORWARD, REVERSE AND LATERAL MOTION OF A DRIVERLESS VEHICLE

CROSS-REFERENCE TO RELATED APPLICATIONS

This application claims the benefit of U.S. Provisional application Ser. No. 60/005,540, filed Oct. 18, 1995.

FIELD OF THE INVENTION

This invention relates to a vehicle navigation and guidance system comprising an apparatus for measuring and accounting for the lateral movement of the vehicle and a method of guiding a vehicle using the same. More particularly, this invention relates to a swivel caster fitted with rotational and swivel angle measurement sensors mounted to a driverless vehicle so that the lateral motion of the vehicle can be detected and accounted for by the vehicle's navigation and guidance system.

BACKGROUND OF THE INVENTION

Navigation and guidance control for automated guidance vehicles are described in GB-A-2,158,965 and U.S. Pat. Nos. 4,847,769, 4,816,998 and 5,175,415. GB-A-2,158,965 and U.S. Pat. No. 4,847,769 both describe vehicles in which the movement is predicted by a dead reckoning system which determines the position of the vehicle at any given time by sensing the steering angle and the angle of rotation of a controlled steering caster during a short time interval. U.S. Pat. No. 4,847,769 further describes a system where the predicted position is frequently checked and corrected against an actual position determined by a vehicle mounted laser scanning and reference frame mounted target system. The error between the predicted position and the actual position is utilized to determine an average crabbing angle which is fed through a Kalman filter calculation and used as a correction factor in calculating the next predicted position of the vehicle.

U.S. Pat. No. 4,816,998 discusses a vehicle that uses a caster wheel having both an angle measuring sensor and a wheel rotation measuring sensor for enabling the navigation and guidance system to calculate a mean distance traveled, a change in angle of an axis on the vehicle and vehicle heading change assuming ideal travel along a fixed radius arcuate path.

U.S. Pat. No. 5,175,415 discusses an apparatus for measuring the forward and reverse movement of a vehicle by placing a separate encoder wheel adjacent to each non-pivoting drive wheel.

All of the navigation and guidance systems heretofore are limited because none of these systems determine their current position by measuring and accounting for the lateral movement of the vehicle. The lateral movement of the vehicle is often referred to as crabbing, scrubbing or side slip. The lateral movement of the vehicle is determined with respect to the vehicle's pivot point. This is typically a location along the longitudinal centerline of the vehicle that the navigation and guidance system attempts to direct along the selected path. A vehicle may experience lateral motion for a variety of reasons, for instance, when the vehicle is: i) misaligned, ii) turned, where the wheels pivot, distort and/or slip, and iii) intentionally steered laterally. Accordingly, the overall tracking accuracy of the systems heretofore is compromised by their inability to measure and account for the lateral movement component in the vehicle's change of position.

It is therefore an object of the present invention to provide a vehicle with a system that determines the change of position of the vehicle regardless of the direction the vehicle travels.

It is another object of the present invention to provide a vehicle with a system that can measure and determine the movement of the vehicle in the forward, reverse and any lateral direction.

It is yet another object of the present invention to provide a vehicle with a navigation and guidance control system that adjusts the steering of the vehicle responsive to the lateral movement of the vehicle.

It is a further object of the present invention to provide a vehicle with a navigation and guidance system on-board the vehicle that steers the vehicle taking into account the vehicle's lateral movement, without requiring an absolute position referencing system that utilizes off-board position identifiers, reflectors or reference markers.

It is still another object of the present invention to provide a vehicle equipped with an angular motion sensor and a freely pivoting caster wheel having a free-wheeling track wheel for sensing the vehicle's movement in two-dimensions with respect to the vehicle frame reference.

It is still a further object of the present invention to provide a vehicle with a navigation and guidance system equipped with a gyroscope and a freely pivoting spring loaded caster wheel having a spherical shaped contact surface, that senses the change of position of the vehicle in two-dimensions, to provide better control of the vehicle.

It is yet a further object of the present invention to provide a vehicle with a navigation and guidance system equipped with a gyroscope and a distance travelled and vehicle rotation sensing caster that allows the caster to be mounted at any location on the vehicle.

It is still a further object of the present invention to provide a vehicle controlled by a navigation and guidance system equipped with an angular motion sensor and a free wheeling, freely pivoting, non-load bearing track wheel caster that detects movement of the vehicle in two-dimensions, with respect to the vehicle frame reference, to provide more accurate control of the vehicle.

These and other objects of the present invention will become readily apparent after studying and understanding the present invention, as hereinafter described.

SUMMARY OF THE INVENTION

The present invention is a vehicle comprising a navigation and guidance system for guiding the vehicle based on information supplied by a first device that senses the heading change of the vehicle and a second device that measures all movement of the vehicle along the surface the vehicle is traversing.

BRIEF DESCRIPTION OF THE DRAWINGS

FIG. 2b is a side view of the track wheel caster assembly depicted in FIG. 2a.

DETAILED DESCRIPTION OF THE INVENTION

Figure 1:
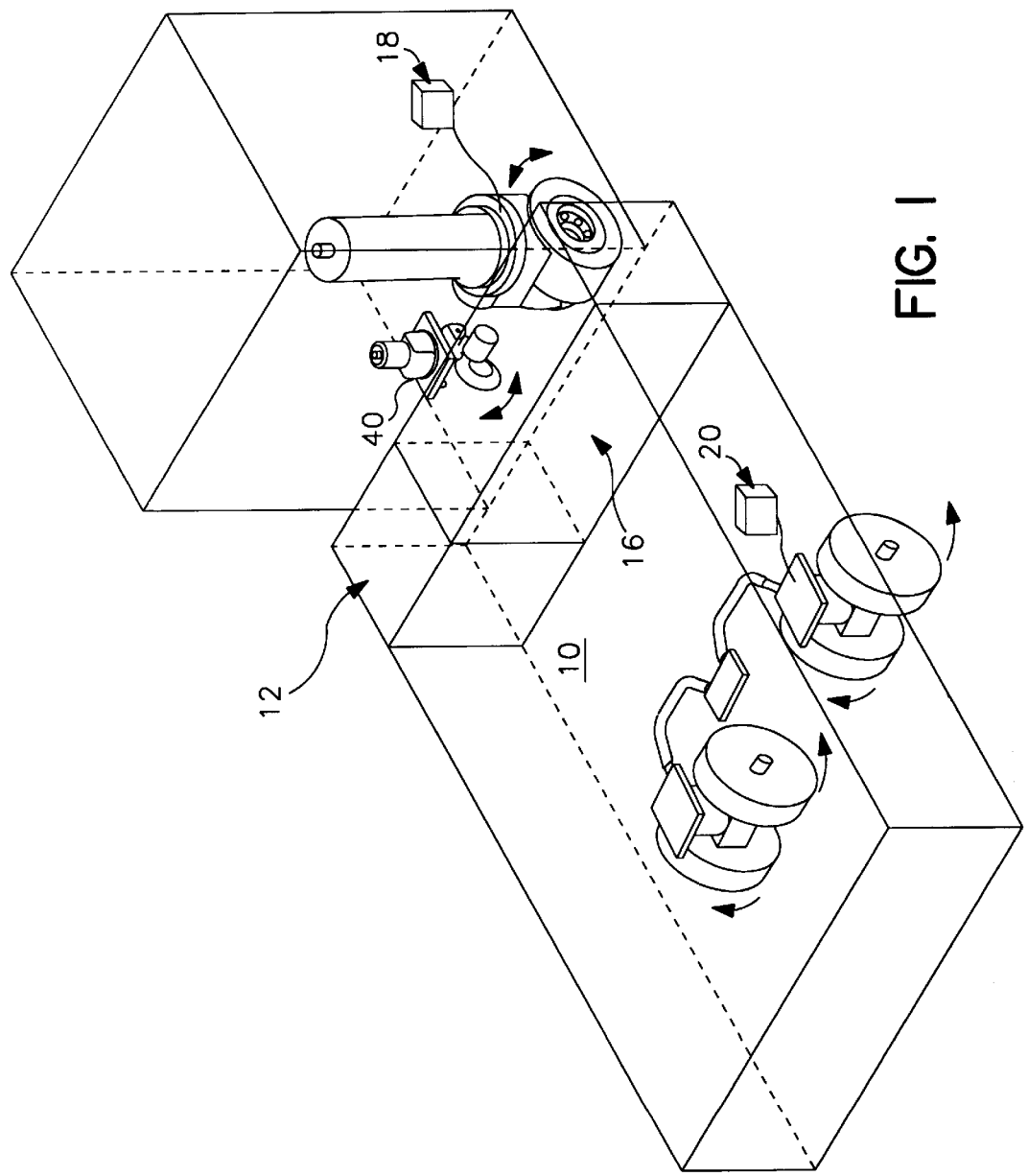
FIG. 1 is a perspective view of a dual-end steering driverless vehicle equipped with a track wheel caster in accordance with the present invention.

Before the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

A preferred embodiment of the present invention is a driverless vehicle comprising a navigation and guidance system having an angular motion sensor and a track wheel caster assembly equipped with a caster pivot sensor and a wheel rotation sensor to determine the relative position of the vehicle by taking into account substantially all movement of the vehicle along the surface upon which the vehicle is travelling. These sensors enable the navigation system to more accurately determine the vehicle's current position and enable the guidance system to guide the vehicle.

FIG. 1 depicts a dual-end steering driverless vehicle 10 comprising a navigation and guidance system equipped with an angular motion sensor 12, a track wheel caster assembly 40, at least one computer processor 16, and a front and a rear steering mechanism 18 and 20, respectively. The vehicle 10 can be any vehicle suitable for this purpose including but not limited to driverless, single-end or dual-end steered, wire and non-wire guided vehicles. Similarly, the computer processor and steering mechanism may be of any conventional type known to be used for this purpose.

The angular motion sensor is employed to supply information about the current heading of the vehicle. Typically, the angular motion sensor is a gyroscope which may be any type of gyroscope suitable for this purpose and may be selected to suit the particular application. Preferably, the gyroscope will be of the solid state rate gyroscope type.

Figure 2A:
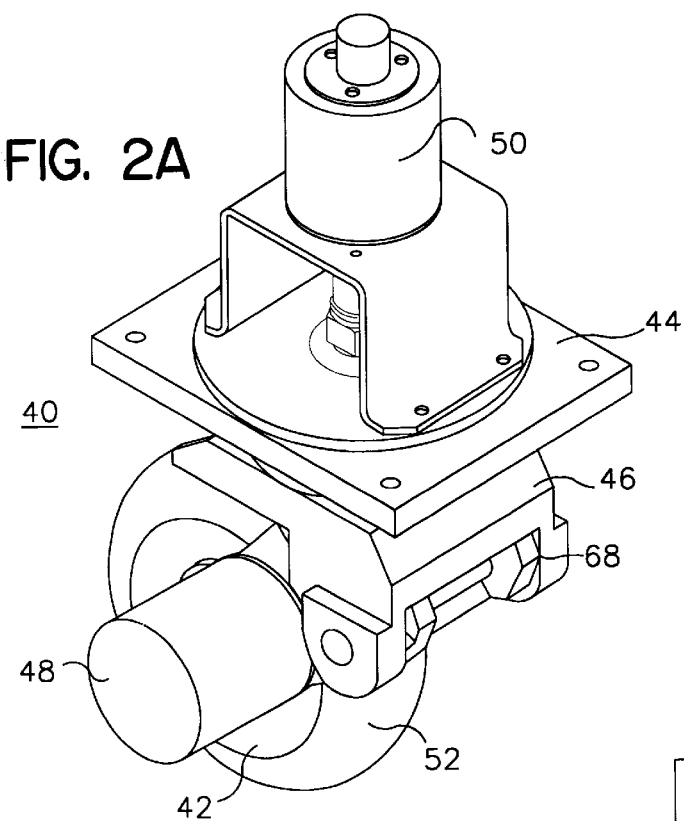
FIG. 2a is a perspective view of a track wheel caster assembly in accordance with the preferred embodiment of the present invention.
Figure 2B:
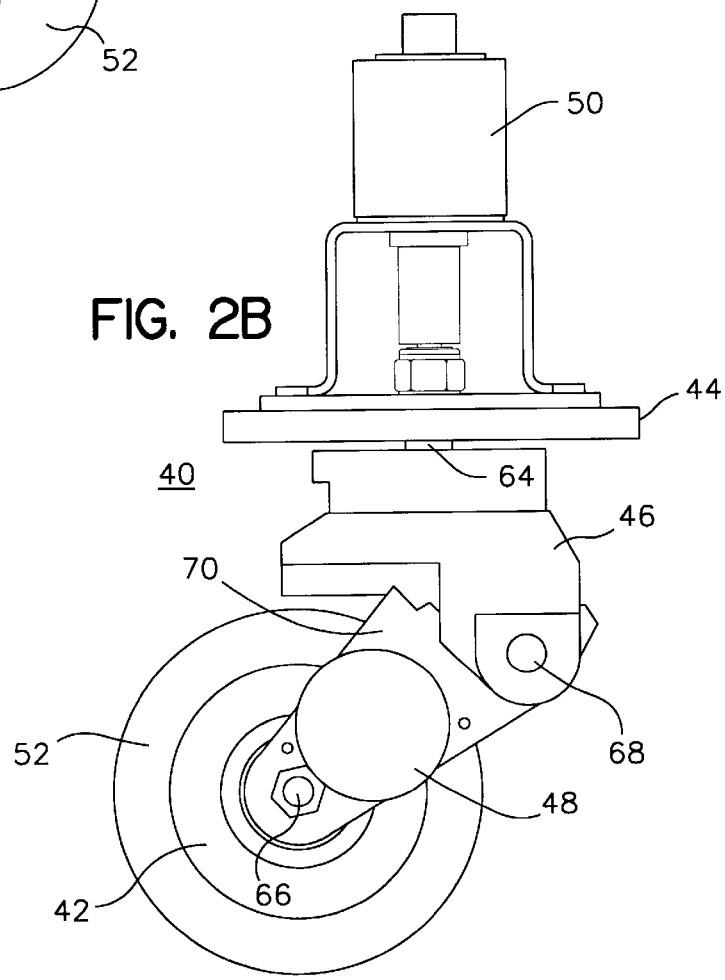

The track wheel caster assembly 40, as best depicted in FIGS. 2(a&b), comprises: a free wheeling contact wheel 42, a mounting plate 44, a freely pivoting castor sub-assembly 46, a wheel rotation sensor 48, and a caster pivot sensor 50. The design of the track wheel caster assembly 40 will depend on the particulars of the application but the design criteria should attempt to optimize the traction of the contact wheel 42 while minimizing its pivot friction.

The contact wheel 42 may be fitted with a tire 52 to achieve better contact properties. A soft tire provides better traction while a harder tire results in lower pivot friction. Therefore, a tire having characteristics that compromise between these two competing factors is preferred. Although the tread profile of the tire 52 may be selected based on the specifics of a particular application, a preferred tread profile is spherically shaped to distribute wheel loading symmetrically about the contact point.

The freely pivoting castor sub-assembly 46 typically comprises a horizontal offset, sometimes referred to as a "caster offset" or "caster lead", between the caster stem 64 and the contact wheel axle 66. This horizontal offset reduces the force required to cause the caster to pivot. The sub-assembly 46 can optionally be adapted with a spring loaded pivot joint 68 and fork 70 that joins the contact wheel 42 to the sub-assembly in a manner which enables the contact wheel 42 to move up and down with respect to the mounting plate 44 to allow the contact wheel 42 to accommodate undulations in the surface.

Figure 4:
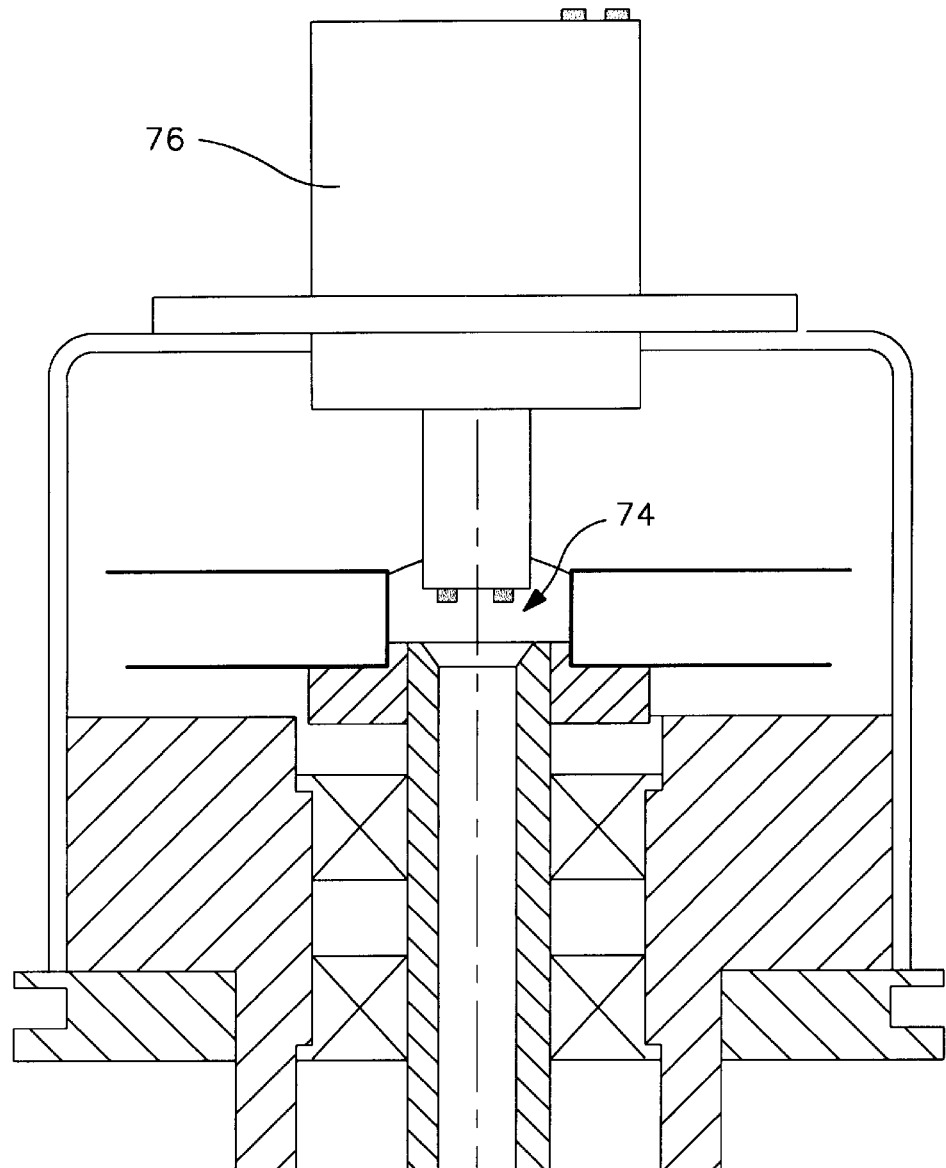
FIG. 4 is a cross-sectional view of an absolute encoder fitted with an electric slip ring assembly in accordance with the preferred embodiment of the present invention.

The wheel rotation sensor 48 may be any device that provides a signal responsive to the rotational movement of the contact wheel which may include optical, magnetic, electro-mechanical sensors or the like. Preferably, the wheel rotation sensor 48 is an incremental shaft encoder positioned about the contact wheel axle 66. More preferably, the incremental shaft encoder will be of the quadrature type which additional provides the direction of rotation. Additionally, the caster pivot sensor 50 may be any device that provides a signal responsive to the rotational movement of the caster sub-assembly 46 with respect to the caster mounting plate 44. Preferably, the caster pivot sensor 50 is an absolute shaft encoder, as depicted in FIG. 4, positioned on the caster stem 64. An absolute shaft encoder provides a signal identifying the absolute position of the measured shaft.

In a more preferred configuration, the caster stem 64 and the absolute shaft encoder will have a hollow shaft 72 and the body of the absolute encoder will have an opening through the center axis of the body 74 leading up to an electric slip ring assembly 76, as shown in FIG. 4, to accommodate signal wires from the wheel rotation sensor 48. An electric slip ring is a device that maintains electrical communication between connections on a first member, commonly referred to as the rotor, that rotates with respect to a second member, commonly referred to as the stator, and corresponding connection on the second member. The signal wires from the wheel rotation sensor 48 will be routed through the hollow caster stem 64, the absolute encoder shaft 72, the body of the encoder 74 and connected to the rotor side of the slip ring assembly 76. Although the signal from the wheel rotation sensor 48 can be communicated to the navigation and guidance system in a variety of ways dependent on the design of the vehicle, this preferred configuration allows unlimited caster pivot rotation in either direction.

Figure 3:
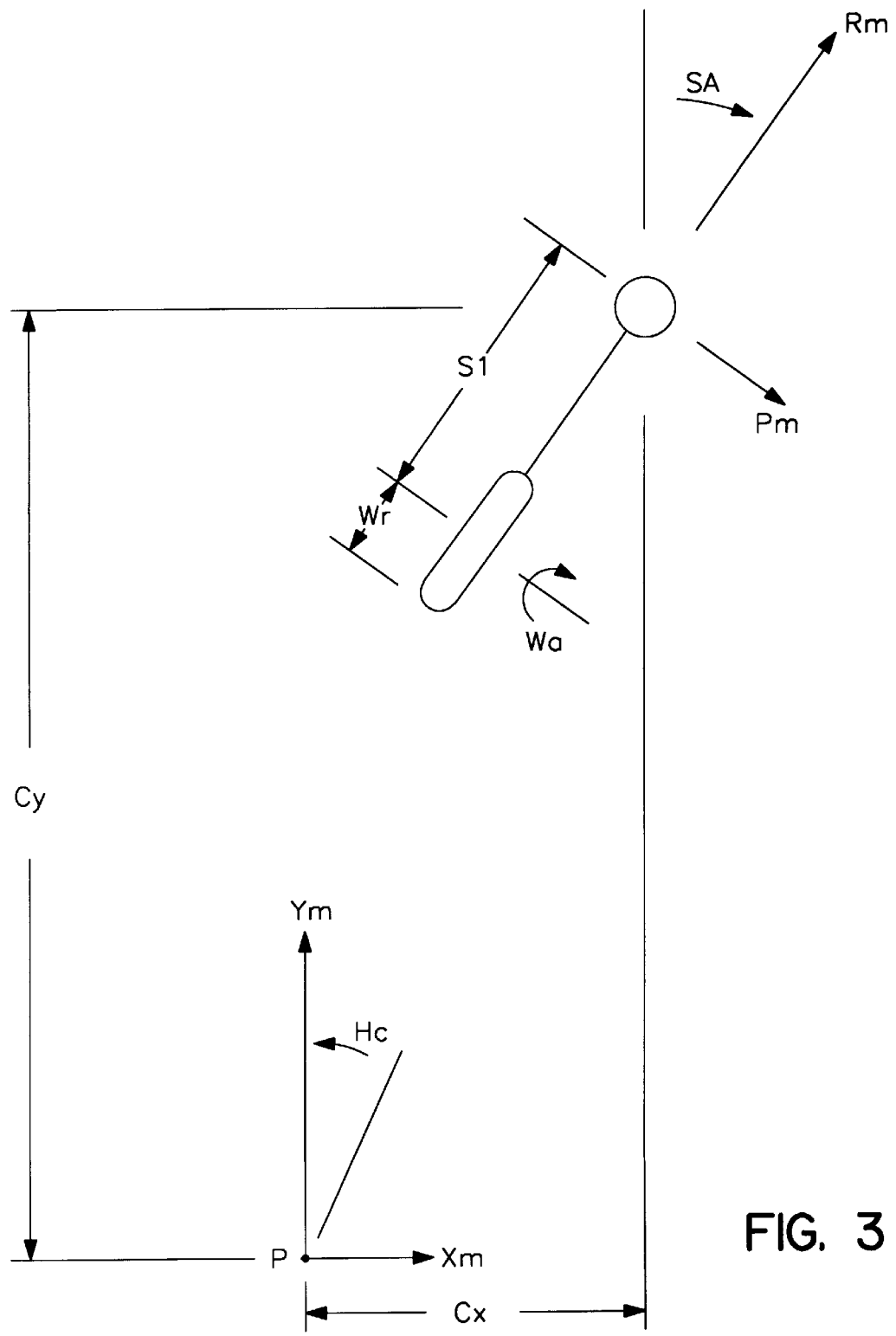
FIG. 3 is a diagrammatical representation of a vehicle equipped with a track wheel caster in accordance with the preferred embodiment of the present invention.

The functioning of a vehicle adapted with a track wheel caster assembly, as depicted in FIGS. 2(a&b), in accordance with a preferred embodiment of the present invention can be described as follows and best understood by referencing FIG. 3. The vehicle's navigation and guidance system on the vehicle operates in a conventional manner by sampling data from various sensors at short time intervals and steering the vehicle responsive to information received from these inputs. More specifically, the navigation and guidance system attempts to guide a point on the vehicle designated as the pivot point P along a selected path or toward a designated location. The pivot point P is typically a location along the longitudinal centerline of the vehicle. The selection of this point may be determined from the design and/or dynamics of the vehicle.

The pivot point P is used as a reference point or origin for calculating vehicle movement with respect to the vehicle's coordinate system, often referred to as vehicle frame reference. The calculations of Ym, that component of the vehicle's change of position in the for and aft direction (Y-direction), and Xm, that component of the vehicle's change of position in the lateral direction (X-direction), are all referenced to an X,Y coordinate system having the pivot point P as the origin.

The track wheel caster assembly is mounted at any arbitrary or convenient location on the vehicle. The position of the caster assembly, specifically the center of the caster pivot axis 64, relative to the pivot point is measured. The measured distance between the two points is recorded as Cy the distance in the Y-direction and Cx the distance in the X-direction both with respect to the vehicle's frame of reference. In addition, the radius Wr of the caster's contact wheel 42 with tire 52 and the distance Sl of the horizontal offset are measured and recorded. These constants are used as part of the calculation of Ym and Xm.

As the vehicle moves, the wheel rotation sensor 48 and/or the caster pivot sensor 50, depending on the vehicle's direction of travel, will sense the motion and transmit a corresponding signal to the navigation and guidance system's computer processor 16. The motion of the vehicle Rm, as sensed by the wheel rotation sensor 48, is the product of the wheel rotation angle Wa, in radians, determined directly from information supplied by the wheel rotation sensor and the wheel radius Wr. The motion of the vehicle Pm, as sensed by the caster pivot sensor 50, is the product of the change in the pivot angle (final angle Sf minus initial angle Si) of the caster less the vehicle's heading change Hc, as determined from the angular motion sensor, and the distance of the caster's horizontal offset Sl. The average caster angle SA between two measuring intervals is the initial angle Si plus half the change in the pivot angle over the measurement interval. Once the measurements and calculations of these variables are determined, it should be clear that $$Xm = Rm \cdot Sin(SA) + Pm \cdot Cos(SA) + Cy \cdot Hc$$

and $$Ym = Rm \cdot Cos(SA) - Pm \cdot Sin(SA) - Cx \cdot Hc.$$

The accuracy of these calculation is increased as the time interval between measurement samples is decreased.

The values of Xm and Ym are then used by the navigation and guidance system to calculate the vehicle's current location so that the guidance system can determine how to direct the vehicle along a desired path or toward a desired location.

EXAMPLES

The following theoretical examples provide further understanding of these calculations.

EXAMPLE 1

A vehicle travels along a straight path then reverses direction with no lateral movement (Xm=0) and no heading change (Hc=0).
Then:

$$Xm = Rm \cdot Sin(SA) + Pm \cdot Cos(SA) = 0$$

$$Ym = Rm \cdot Cos(SA) - Pm \cdot Sin(SA)$$

Initially:

$$SA = 0 \text{ deg. and } Ym = Rm.$$

Note that the sign of Ym is negative because Rm is negative (wheel is rotating backwards). This is an unstable condition which could, in theory, continue indefinitely. Caster translation begins when a disturbance causes SA to change. During translation, motion is constrained by:

$$\frac{RM}{PM} = -\frac{Cos(SA)}{Sin(SA)}$$

When SA=(+ or −) 90 deg., the wheel stops rotating and:

$$YM = (+ \text{ or } -)Pm$$

Caster translation continues indefinitely as SA approaches 180 deg. A practical limit is defined by the resolution of the caster pivot encoder. Caster translation is complete when the caster pivot angle measures 180 deg.
Finally:

$$SA = 180 \text{ deg. and } Ym = -Rm.$$

Note that the sign of Ym is negative because Cos(SA)=−1.

EXAMPLE 2

A vehicle is pushed sideways so all motion is lateral (Ym=0) with no heading change (Hc=0).
Then:

$$Xm = Rm \cdot Sin(SA) + Pm \cdot Cos(SA)$$

$$Ym = Rm \cdot Cos(SA) - Pm \cdot Sin(SA) = 0$$

Initially:

$$SA = 0 \text{ deg. and } Xm = Pm.$$

Note that the wheel does not move and initial motion is detected as caster pivot motion only. However, caster pivot causes SA to change and caster translation begins immediately. During translation, motion is constrained by:

$$\frac{RM}{PM} = \frac{Sin(SA)}{Cos(SA)}$$

Caster translation continues indefinitely as SA approaches (+ or −) 90 deg. Practical caster translation is complete when the caster pivot sensor measures (+ or −) 90 deg.
Finally:

$$SA = (+ \text{ or } -) 90 \text{ deg. and } Xm = (+ \text{ or } -)Rm$$

Note that Rm is always positive and sign of Xm is defined by Sin(SA).

EXAMPLE 3

A vehicle is forced to rotate around the point of wheel contact with no wheel rotation (Rm=0) and a fixed caster pivot angle (SA=Sf=Si=0 deg.)
Then:

$$Xm = Pm + Cy \cdot Hc = -Sl \cdot Hc + Cy \cdot Hc = (Cy - Sl) \cdot Hc$$

$$Ym = -Cx \cdot Hc$$

Note that all motion is due to heading change multiplied by a fixed dimensional offsets.

EXAMPLE 4

A vehicle is forced to rotate about the caster stem with no wheel rotation (Rm=0) and caster pivot angle is constrained by heading change (Sf−Si=Hc).
Then:

$$Pm = Sl \cdot (Sf - Si - Hc) = 0$$

And:

$$Xm = Cy \cdot Hc$$

$$Ym = -Cx \cdot Hc$$

Note, again, that all motion is due to heading change multiplied by fixed dimensional offsets.

EXAMPLE 5

A vehicle travels along a straight path, then, stops and initiates a 45 deg. crab maneuver (Xm=Ym) with no heading change (Hc=0).

7

Then:

$$Xm = Rm \cdot Sin(SA) + Pm \cdot Cos(SA)$$

$$Ym = RM \cdot Cos(SA) - Pm \cdot Sin(SA)$$

Initially:

$$SA = 0 \text{ deg. and } Xm = Rm = Ym = Pm$$

Note that wheel rotation motion and caster pivot motion are equal. However caster pivot causes SA to change and caster translation begins immediately.

During translation, motion is constrained by:

$$Rm \cdot Sin(SA) + Pm \cdot Cos(SA) = Rm \cdot Cos(SA) - Pm \cdot Sin(SA)$$

Center translation continues indefinitely as SA approaches 45 deg. Practical translation is complete when the caster pivot sensor measures 45 deg.

Finally:

$$SA = 45 \text{ deg. and } Pm = 0$$

$$Xm = Rm \cdot Sin(SA) \quad Ym = Rm \cdot Cos(SA)$$

Note that all motion is due to wheel rotation multiplied by a constant derived from SA. A similar analysis is valid for any crab angle.

What is claimed is:

1. A driverless vehicle comprising:
   a vehicle body having a plurality of wheels linked thereto; and
   means for sensing forward, reverse and lateral movement of at least one of said plurality of wheels along a surface said at least one wheel is traversing without using one or more fixed reference markers placed along a path of travel for the driverless vehicle.

2. The vehicle of claim 1 wherein said means comprises an angular motion sensor for sensing the heading change of said vehicle.

3. The vehicle of claim 2 wherein said vehicle further comprised a navigation and guidance system for directing the movement of said vehicle responsive to information supplied from said means.

4. A driverless vehicle comprising:
   means for sensing forward, reverse and lateral movement of said vehicle along the surface said vehicle is traversing, wherein said means comprises an angular motion sensor for sensing the heading change of the vehicle and a swivel caster for sensing substantially all motion of said vehicle along the surface.

5. The vehicle of claim 4 wherein said swivel caster is freely pivoting.

6. The vehicle of claim 5 wherein said swivel caster comprises:
   a wheel rotation sensor; and
   a caster pivot sensor.

7. The vehicle of claim 6 wherein said angular motion sensor is a gyroscope.

8. The vehicle of claim 7 wherein said vehicle further comprises a navigation and guidance system for directing the movement of said vehicle responsive to information supplied from said means.

9. The vehicle of claim 8 wherein said navigation and guidance system determines the change of position of said vehicle by taking into account substantially all forward, reverse and lateral movement of said vehicle.

10. An driverless vehicle comprising
    a steering mechanism,
    an apparatus for adjusting said steering mechanism comprising
       an angular motion sensor;
       a caster having
          a contact wheel,
          a wheel rotation sensor, and
          a caster pivot sensor;
       a computer in electrical communication with said angular motion sensor, wheel rotation sensor and said caster pivot sensor, wherein said computer calculates:
          Ym the vehicle's change of position in the vehicle's forward and reverse direction; and
          Xm the vehicle's change of position in the vehicle's lateral direction.

11. The vehicle of claim 10 wherein said Ym and Xm calculations comprise at least one of the following calculated variables:
    Rm is a calculated distance based in part on information supplied from said wheel rotation sensor;
    SA is a calculated average caster rotation angle based in part on information supplied by said caster pivot sensor; and
    Pm is a calculated vehicle motion based in part on information supplied by said angular motion sensor and said caster pivot sensor.

12. The vehicle of claim 11 wherein $$Ym = Rm \cdot Cos(SA) - Pm \cdot Sin(SA) - Cx \cdot Hc$$

wherein:
    Cx is a constant, and
    Hc is the heading change of said vehicle.

13. The vehicle of claim 12 wherein $$Xm = Rm \cdot Sin(SA) + Pm \cdot Cos(SA) + Cy \cdot Hc$$

wherein:
    Cy is a constant, and
    Hc is the heading change of said vehicle.

14. A vehicle comprising:
    a navigation and guidance system for guiding said vehicle comprising:
    a steering mechanism,
    means for adjusting said steering mechanism comprising:
       an angular motion sensor;
       a freely pivoting caster having
          a free spinning wheel,
          a wheel rotation sensor, and
          a caster pivot sensor;
       a computer in electrical communication with said angular motion sensor, wheel rotation sensor and said caster pivot sensor, wherein said computer calculates:

$$Ym = Rm \cdot Cos(SA) - Pm \cdot Sin(SA) - Cx \cdot Hc$$

$$Xm = Rm \cdot Sin(SA) + Pm \cdot Cos(SA) + Cy \cdot Hc$$

wherein:
    Ym the vehicle's change of position in the vehicle's forward and reverse direction; and
    Xm the vehicle's change of position in the vehicle's lateral direction;
    Rm is a calculated distance based in part on information supplied from said wheel rotation sensor;

SA is a calculated average caster rotation angle based in part on information supplied by said caster pivot sensor;

Pm is a calculated vehicle motion based in part on information supplied by said angular motion sensor and said caster pivot sensor;

Cy is a constant;

Cx is a constant; and

Hc is the heading change of said vehicle.

15. A navigation and guidance system for guiding a driverless vehicle comprising:

a motion sensing wheel assembly including a wheel; and means for sensing forward, reverse and lateral movement of the wheel along a surface said wheel is traversing without using one or more fixed reference markers placed along a path of travel for the driverless vehicle.

16. The system of claim 15 wherein said means comprises an angular motion sensor for sensing the heading change of said vehicle.

17. The system of claim 16 wherein said system directs the movement of said vehicle responsive to information supplied from said means.

18. A navigation and guidance system for guiding a driverless vehicle comprising means for sensing forward, reverse and lateral movement of said vehicle along the surface said vehicle is traversing, wherein said means comprises an angular motion sensor for sending heading change of said vehicle, said system directing movement of said vehicle responsive to information supplied from the sensing means, said means further comprising a swivel caster for sensing substantially all motion of said vehicle along the surface.

19. The system of claim 18 wherein said swivel caster is freely pivoting.

20. The system of claim 19 wherein said swivel caster comprises:

a wheel rotation sensor; and a caster pivot sensor.

21. The system of claim 20 wherein said angular motion sensor is a gyroscope.

22. The system of claim 21 wherein said navigation and guidance system determines the change of position of said vehicle by taking into account substantially all forward, reverse and lateral movement of said vehicle.

23. A navigation and guidance system for guiding a vehicle comprising:

a steering mechanism, an apparatus for adjusting said steering mechanism comprising an angular motion sensor;

a caster having a contact wheel, a wheel rotation sensor, and a caster pivot sensor;

a computer in electrical communication with said angular motion sensor, wheel rotation sensor and said caster pivot sensor, wherein said computer calculates:

Ym the vehicle's change of position in the vehicle's forward and reverse direction; and Xm the vehicle's change of position in the vehicle's lateral direction.

24. The system of claim 23 wherein said Ym and Xm calculations comprise at least one of the following calculated variables:

Rm, where Rm is a calculated distance based in part on information supplied from said wheel rotation sensor;

SA, where SA is a calculated average caster rotation angle based in part on information supplied by said caster pivot sensor; and Pm, where Pm is a calculated vehicle motion based in part on information supplied by said angular motion sensor and said caster pivot sensor.

25. The system of claim 24 wherein $$Ym = Rm \cdot \cos(SA) - Pm \cdot \sin(SA) - Cx \cdot Hc$$

wherein:

Cx is a constant, and

Hc is the heading change of said vehicle.

26. The system of claim 25 wherein $$Xm = Rm \cdot \sin(SA) + Pm \cdot \cos(SA) + Cy \cdot Hc$$

wherein:

Cy is a constant, and

Hc is the heading change of said vehicle.

27. A navigation and guidance system for guiding a vehicle comprising:

a steering mechanism, means for adjusting said steering mechanism comprising:

an angular motion sensor;

a freely pivoting caster having a free spinning wheel, a wheel rotation sensor, and a caster pivot sensor;

a computer in electrical communication with said angular motion sensor, wheel rotation sensor and said caster pivot sensor, wherein said computer calculates:

$$Ym = Rm \cdot \cos(SA) - Pm \cdot \sin(SA) - Cx \cdot Hc$$

$$Xm = Rm \cdot \sin(SA) + Pm \cdot \cos(SA) + Cy \cdot Hc$$

wherein:

Ym the vehicle's change of position in the vehicle's forward and reverse direction; and Xm the vehicle's change of position in the vehicle's lateral direction;

Rm is a calculated distance based in part on information supplied from said wheel rotation sensor;

SA is a calculated average caster rotation angle based in part on information supplied by said caster pivot sensor;

Pm is a calculated vehicle motion based in part on information supplied by said angular motion sensor and said caster pivot sensor;

Cy is a constant;

Cx is a constant; and

Hc is the heading change of said vehicle.

28. A method of guiding a vehicle comprising the steps of calculating

Ym the vehicle's change of position in the vehicle's forward and reverse direction based on sensed forward and reverse motion; and Xm the vehicle's change of position in the vehicle's lateral direction based on sensed lateral motion; and guiding said vehicle responsive to Ym and Xm without using one or more fixed reference markers placed along a path of travel for the vehicle.

29. The method of claim 28 wherein said calculation comprises information supplied by an angular motion sensor located on said vehicle.

30. A method of guiding a vehicle comprising calculating: Ym the vehicle's change of position in the vehicle's forward and reverse direction: and Xm the vehicle's change of position in the vehicle's lateral direction; and guiding said vehicle responsive to Ym and Xm, wherein said calculation comprises information supplied by an angular motion sensor located on said vehicle and information supplied by a freely pivoting caster having a free spinning wheel, a wheel rotation sensor, and a caster pivot sensor.

31. The method of claim 30 wherein said calculation of:

$$Ym = Rm \cdot Cos(SA) - Pm \cdot Sin(SA) - Cx \cdot Hc;$$

and $$Xm = Rm \cdot Sin(SA) + Pm \cdot Cos(SA) + Cy \cdot Hc$$

wherein:
- Rm is a calculated distance based in part on information supplied from said wheel rotation sensor,
- SA is a calculated average caster rotation angle based in part on information supplied by said caster pivot sensor,
- Pm is a calculated vehicle motion based in part on information supplied by said angular motion sensor and said caster pivot sensor,
- Cy is a constant,
- Cx is a constant, and
- Hc is the heading change of said vehicle.

32. A caster comprising:
- mounting means for affixing said caster to a device; a free wheeling contact wheel assembly having a free wheeling contact wheel which rotates on an axle;
- first means for sensing rotation of said free wheeling contact wheel about said axle;
- pivoting means for rotationally connecting said free wheeling contact wheel assembly to said mounting means, wherein said pivoting means enables said free wheeling contact wheel assembly to rotate about an axis perpendicular to said axle;
- second means for sensing rotation of said free wheeling contact wheel assembly about said axis and for sensing lateral motion of the vehicle as the free wheeling contact wheel travels along a surface; and
- connecting means for electrically connecting said first means to a point fixed with respect to said mounting means.

33. The caster of claim 32 wherein said connecting means comprises:
- an electric slip ring which enables said assembly to rotate about said axis limitlessly in either direction while maintaining electrical communication between said first means and said point.

34. The caster of claim 33 wherein said slip ring is centered about said axis.

35. The caster of claim 32 wherein said connecting means comprises:
- a set of conductors routed from said first means through an opening in said assembly and through an opening in said second means and connected to an electric slip ring positioned on said axis which enables said assembly to rotate about said pivot means limitlessly in either direction while maintaining electrical communication with a set of terminals which remain fixed with respect to said mounting means; wherein said openings extend and are centered along said axis.

36. The caster of claim 32, wherein the device is a driverless vehicle.

* * * * *